US005886758A

United States Patent [19]
Ibaraki

[11] Patent Number: 5,886,758
[45] Date of Patent: Mar. 23, 1999

[54] LIQUID CRYSTAL BACKLIGHT SOCKET

[75] Inventor: Kazuaki Ibaraki, Higashimurayama, Japan

[73] Assignee: Japan Aviation Electronics Industry, Tokyo, Japan

[21] Appl. No.: 927,188

[22] Filed: Sep. 11, 1997

[51] Int. Cl.[6] .................. G02F 1/1333
[52] U.S. Cl. .................. 349/58; 349/61
[58] Field of Search .................. 349/58, 59, 60, 349/61, 62, 65, 67, 68, 69, 70, 71; 313/318.02, 318.05; 439/227, 228, 229, 230, 231, 232, 375, 602, 168

[56] References Cited

U.S. PATENT DOCUMENTS

| | | | |
|---|---|---|---|
| 5,375,005 | 12/1994 | Komano | 349/50 |
| 5,664,873 | 9/1997 | Kanda et al. | 362/97 |
| 5,673,128 | 9/1997 | Ohta et al. | 349/61 |

*Primary Examiner*—William L. Sikes
*Assistant Examiner*—James A Dudek
*Attorney, Agent, or Firm*—Laff, Whitesel, Conte & Saret, Ltd.

[57] ABSTRACT

An electric shock is avoided by prohibiting a finger or hand from touching an electrode portion of a liquid crystal backlight socket or a connector electrode of a backlight lamp. Further, the breakage of the backlight lamp, which would be otherwise caused due to vibration or shock transmitted through a structure in which the socket is rigidly fixed to a liquid crystal circuit board, is avoided. The backlight socket includes a pair of leaf spring contacts each having a backlight connector electrode connecting portion, an inner insulator and an outer insulator. Each contact is fixed to the inner insulator and the outer insulator so that the inner insulator is elastically supported inside the outer insulator by the pair of contacts. Further, the backlight connector electrode connecting portions of the contacts are disposed in a manner so as not to be exposed to the exterior of the inner insulator.

3 Claims, 3 Drawing Sheets

LIQUID CRYSTAL BACKLIGHT SOCKET

BACKGROUND OF THE INVENTION

This invention relates to a liquid crystal display with a backlight, and, in particular, to a socket for the backlight.

In the prior art, there is known a liquid crystal display with a backlight. The liquid crystal display has a circuit board onto which sockets are mounted and electrically connected. The backlight is received by the sockets and is thereby electrically connected to a backlight power source in the liquid crystal display. The backlight is referred to as a liquid crystal backlight. The circuit board is referred to as a liquid crystal circuit board. The sockets are referred to as liquid crystal sockets.

FIG. 1 shows a conventional liquid crystal backlight socket, and FIG. 2 shows a lighting device incorporating a pair of conventional liquid crystal backlight sockets shown in FIG. 1, while a backlight lamp is detached from the lighting device.

As shown in FIG. 1, a backlight socket 110 is formed by blanking and bending a leaf spring metal plate in a given manner. The backlight socket 110 has a shape which is symmetrical both in a forward/backward direction and in a rightward/leftward direction. The backlight socket 110 comprises a pair of confronting retaining portions 110A arranged in the forward/backward direction at the center, and a pair of mounting portions 110B arranged at both sides.

As shown in FIG. 2, a lighting device comprises a pair of backlight sockets 110, a liquid crystal circuit board 120, a frame 130, a backlight reflector 140 and a U-shaped backlight lamp 150. On the circuit board 120, the pair of backlight sockets 110 are fixed, and the frame 130 is fixedly mounted. The backlight reflector 140 is disposed in the frame 130, and the backlight lamp 150 is disposed in the backlight reflector 140. A pair of connector electrodes 150A of the backlight lamp 150 are each retained between the retaining portions 110A of the corresponding backlight socket 110.

As seen from FIGS. 1 and 2, since each of the backlight sockets 110 is entirely exposed to the exterior, if a finger or hand touches the backlight socket 110 during feeding the power, an electric shock is caused. Since the backlight lamp 150 normally employs a cold cathode discharge tube which requires a high voltage for lighting up, it is dangerous.

Further, since the backlight socket 110 is rigidly fixed to the circuit board 120, when the stress is applied to the backlight socket 110 from the circuit board 120 due to vibration or shock, the stress is directly transmitted to the backlight lamp 150 which, thus, may be subjected to breakage.

Furthermore, in case of the backlight lamp 150 is a fluorescent tube, when each of the connector electrodes 150A of the backlight lamp 150 has been twisted by the stress transmitted via the backlight socket 110 from the circuit board 120, the backlight lamp 150 is apt to break.

SUMMARY OF THE INVENTION

It is therefore an object of this invention to provide a liquid crystal backlight socket which can avoid an electric shock by prohibiting a finger or hand from touching an electrode portion of the socket or a connector electrode of a backlight lamp.

It is another object of this invention to provide a liquid crystal backlight socket which can avoid breakage of a backlight lamp which would be otherwise caused due to vibration or shock transmitted through a structure in which the socket is rigidly fixed to a liquid crystal circuit board.

It is still another object of this invention to provide a liquid crystal backlight socket which can avoid breakage of a backlight lamp which would be caused due to stress transmitted via a backlight socket from a circuit board.

According to this invention, there is provided a liquid crystal backlight socket comprising a pair of leaf spring contacts each having a connecting portion for electrically connecting with a connecting electrode of a liquid crystal backlight; an outer insulator fixedly supporting the pair of leaf spring contacts; and an inner insulator having a bore for receiving a connecting electrode portion of the liquid crystal backlight, the inner insulator being elastically supported by the pair of leaf spring contacts in the outer insulator, the connecting portion of each of the pair of leaf spring contacts being exposed in the bore of the inner insulator.

DESCRIPTION OF THE PREFERRED EMBODIMENT

Now, an embodiment of this invention will be described with reference to FIGS. 3 to 6.

Figure 1:
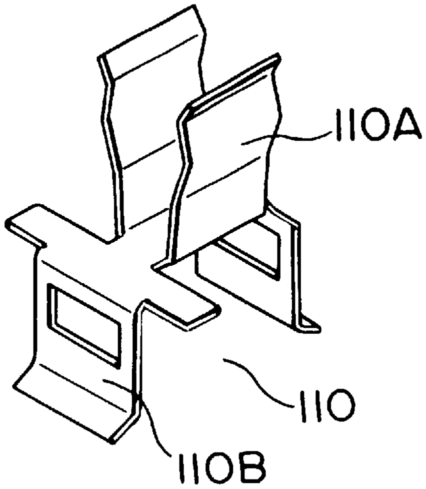
FIG. 1 PRIOR ART
FIG. 1 is a perspective view of a conventional liquid crystal backlight socket.
Figure 2:
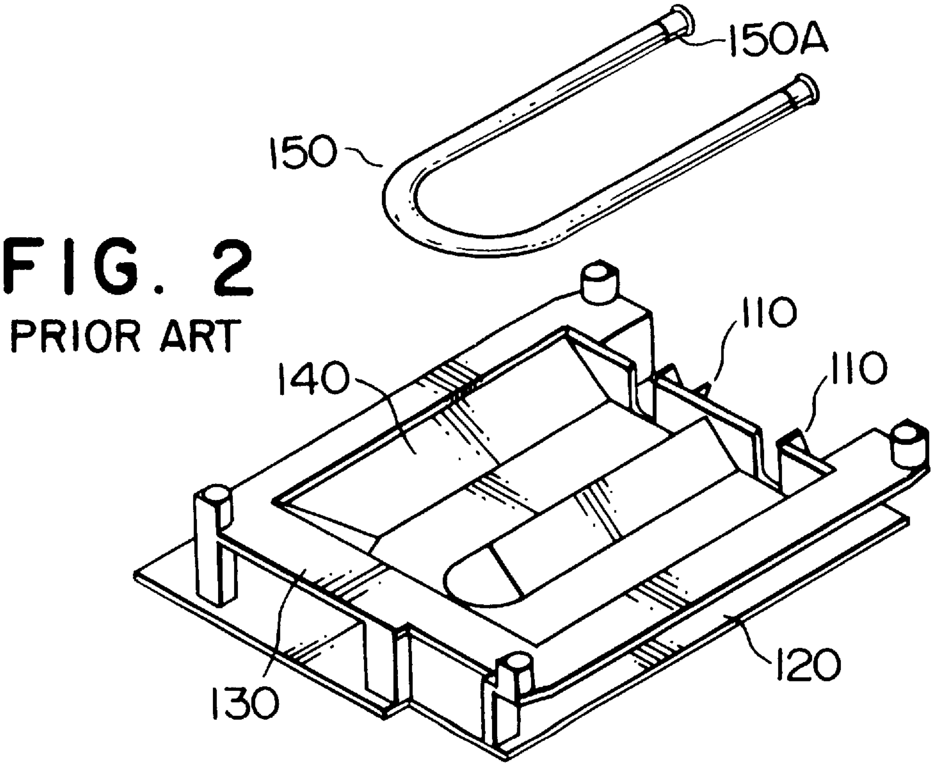
FIG. 2 PRIOR ART
FIG. 2 is a perspective view of a lighting device incorporating a pair of conventional liquid crystal backlight sockets shown in FIG. 1, while a backlight lamp is detached.
Figure 3:
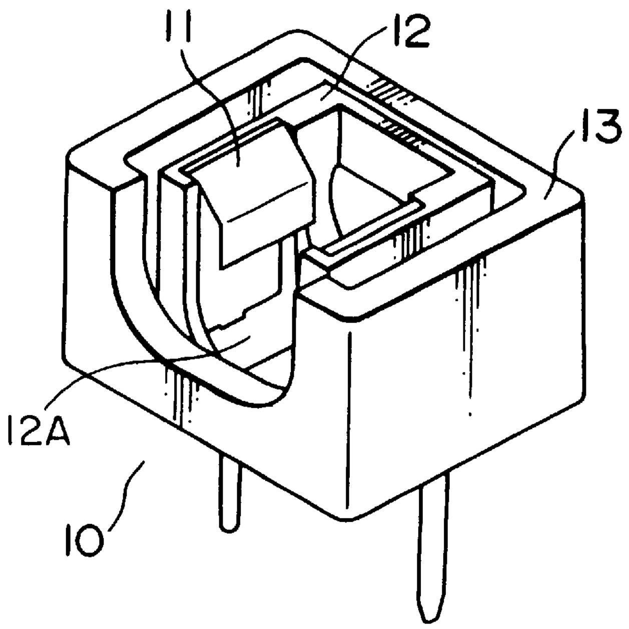
FIG. 3 is a perspective view of a liquid crystal backlight socket according to an embodiment of this invention.
Figure 4:
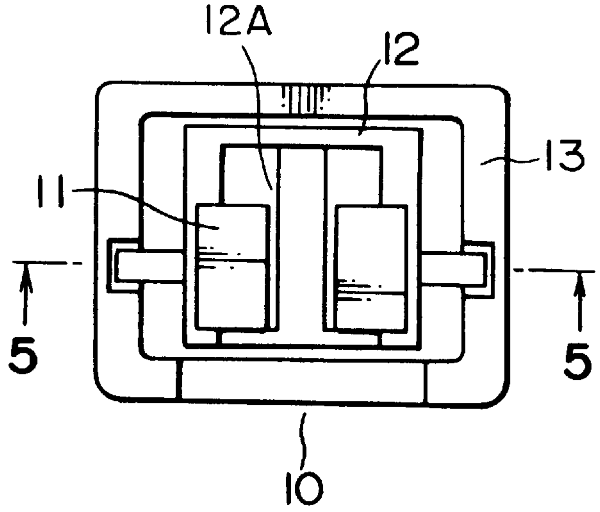
FIG. 4 is a plan view of the liquid crystal backlight socket shown in FIG. 3.

As shown in FIGS. 3 and 4, a backlight socket 10 comprises a pair of contacts 11 in a continuous manner, an inner insulator 12 in the shape of a rectangular box without an upper wall, and an outer insulator 13 in the shape of a rectangular box without upper and lower walls. The box size of the outer insulator 13 is larger than the box size of the inner insulator 12. The inner insulator 12 is movable within the outer insulator 13 in any directions. The inner insulator 12 has a bore 12A for receiving a connector electrode of a backlight lamp, and is elastically supported by the pair of contacts 11 in the outer insulator 13. The outer insulator 13 supports fixedly the pair of contacts 11. A backlight connector electrode connecting portion of each of the pair of contacts 11 is exposed in the bore 12A of the inner insulator 12.

Figure 5:
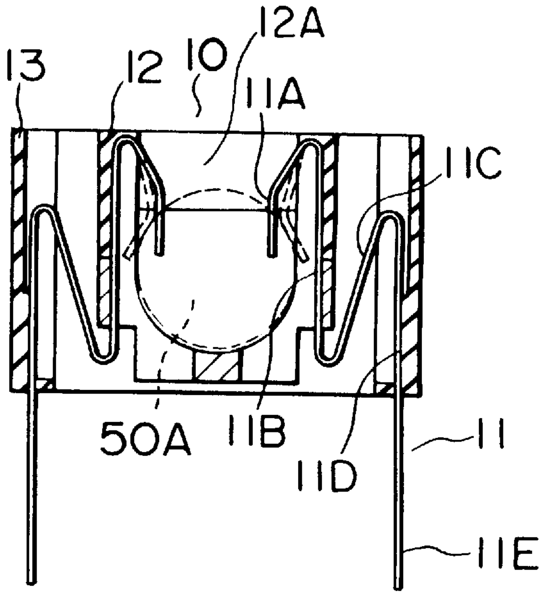
FIG. 5 is a sectional view taken along line A—A in FIG. 4.

Each of the contacts 11 is made from a leaf spring plate. As shown in FIG. 5, the contact 11 comprises the backlight connector electrode connecting portion 11A, a fixed portion 11B relative to the inner insulator 12, a connecting portion 11C between the inner insulator 12 and the outer insulator 13, a fixed portion 11D relative to the outer insulator 13, and a board connecting portion 11E.

Figure 6:
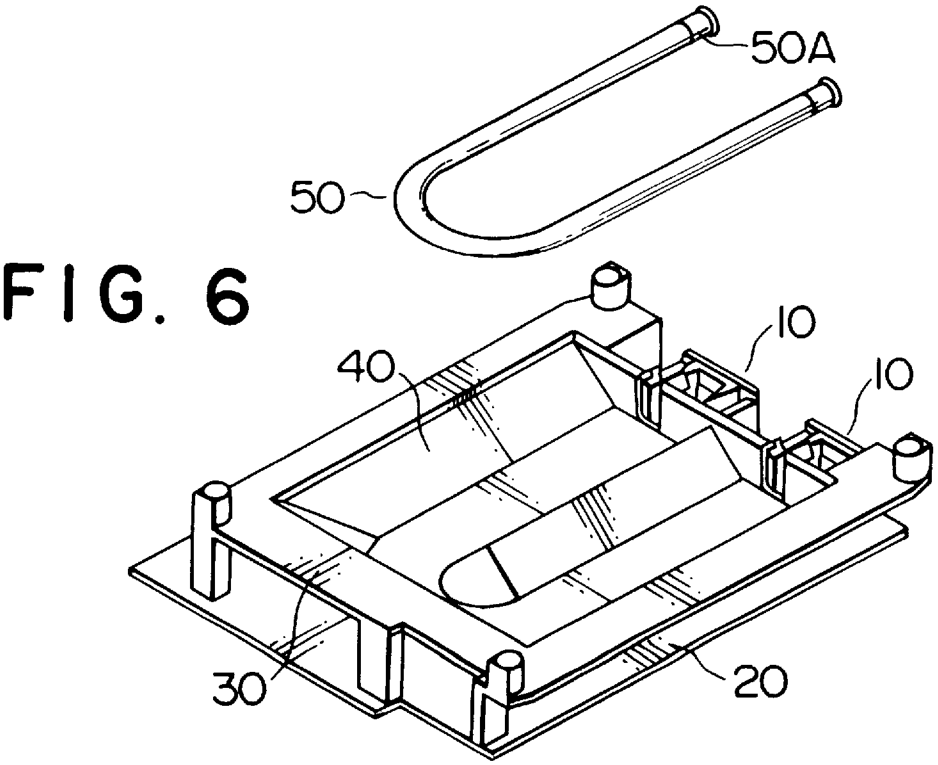
FIG. 6 is a perspective view of a lighting device incorporating a pair of liquid crystal backlight sockets shown in FIGS. 3 through 5, while a backlight lamp is detached.

As shown in FIG. 6, a lighting device comprises a pair of backlight sockets 10, a liquid crystal circuit board 20, a frame 30, a backlight reflector 40, and a U-shaped backlight lamp 50. On the circuit board 20, the pair of backlight sockets 10 are fixed, and the frame 30 is fixedly mounted. The backlight reflector 40 is disposed in the frame 30, and the backlight lamp 50 is disposed in the backlight reflector 40. A pair of connector electrodes 50A of the backlight lamp 50 are each retained between the backlight connector electrode connecting portions 11A of the pair of contacts 11 of the corresponding backlight socket 10.

Broken lines in FIG. 5 show the state when the connector electrode 50A of the backlight lamp 50 has been retained between the backlight connector electrode connecting portions 11A of the pair of contacts 11 of the corresponding backlight socket 10.

The backlight lamp 50 is supplied with the power for lighting via the pair of backlight sockets 10 fixed to the circuit board 20. The backlight lamp 50, when lighted up, applies transmitting light to, that is, backlights, a liquid crystal panel arranged over the backlight lamp 50. For utilizing the light from the backlight lamp 50 with high efficiency, the backlight reflector 40 is provided.

As seen from FIGS. 3 to 6, since each of the connector electrodes 50A of the backlight lamp 50 and the backlight connector electrode connecting portions 11A of the pair of contacts 11 are enclosed by the inner insulator 12 in each of the backlight sockets 10, the danger of electric shock due to touching by a finger or hand hardly occurs.

Further, the inner insulator 12 is independent of the outer insulator 13 which is fixed to the circuit board 20, and is elastically supported relative to the outer insulator 13 by the connecting portions 11C of the pair of contacts 11 arranged between the inner insulator 12 and the outer insulator 13. Accordingly, the stress transmitted from the circuit board 20 to the inner insulator 12 can be relaxed. Thus, the breakage of the backlight lamp 50, which is supported by the backlight connector electrode connecting portions 11A of the contacts 11 of the pair of backlight sockets 10, can be prevented.

As appreciated from the foregoing description, according to this invention, the following effects can be achieved:

(1) Since the exposure of the contacts of the backlight socket and the connector electrode of the backlight lamp can be prevented, there is essentially no danger of electric shock upon adjustment, test or the like.

(2) Since a floating structure is achieved in which the connector electrode of the backlight lamp is elastically supported via the backlight connector electrode connecting portions of the contacts in the backlight socket, the breakage of the backlight lamp, which would be otherwise caused due to poor mounting accuracy, error in assembling or vibration/shock upon transportation after assembly, can be prevented.

What is claimed is:

1. A liquid crystal backlight socket comprising:

a pair of leaf spring contacts each having a connecting portion for electrically connecting with a connecting electrode of a liquid crystal backlight;

an outer insulator fixedly supporting said pair of leaf spring contacts; and an inner insulator having a bore for receiving a connecting electrode portion of said liquid crystal backlight, said inner insulator being elastically supported by said pair of leaf spring contacts in said outer insulator, said connecting portion of each of said pair of leaf spring contacts being exposed in said bore of said inner insulator.

2. A liquid crystal backlight socket as claimed in claim 1, wherein each of said pair of leaf spring contacts having, in a continuous manner, said backlight connector electrode connecting portion, a fixed portion relative to said inner insulator, a connecting portion between said inner insulator and said outer insulator, a fixed portion relative to said outer insulator, and a board connecting portion.

3. A liquid crystal backlight socket as claimed in claim 1, wherein said inner insulator has a shape of a box without an upper wall, and said outer insulator has a shape of a larger box without upper and lower walls than said box of said inner insulator.

* * * * *